(12) United States Patent
Lim

(10) Patent No.: US 6,769,710 B1
(45) Date of Patent: Aug. 3, 2004

(54) LUNETTE HITCH APPARATUS

(75) Inventor: James G. Lim, Macomb, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/463,881

(22) Filed: Jun. 16, 2003

(51) Int. Cl.[7] .................................................. B60D 1/00
(52) U.S. Cl. ...................... 280/490.1; 280/515; 280/495
(58) Field of Search ............................ 280/490.1, 495, 280/497, 504, 515

(56) References Cited

U.S. PATENT DOCUMENTS

| | | | | |
|---|---|---|---|---|
| 4,078,823 A | * | 3/1978 | McBride | ................... 280/490.1 |
| 4,373,847 A | * | 2/1983 | Hipp et al. | ................... 414/401 |
| 4,429,895 A | * | 2/1984 | Hunter | ................... 280/490.1 |
| 5,511,813 A | * | 4/1996 | Kravitz | ........................ 280/495 |

* cited by examiner

*Primary Examiner*—Lesley D Morris
*Assistant Examiner*—L. Lum
(74) *Attorney, Agent, or Firm*—David L. Kuhn; Clifford C. Carter; Gail S. Soderling

(57) ABSTRACT

A trailer hitch apparatus for use with a lunette eye mounting includes a housing with a lunette eye on one end. A housing has a plurality of rectangular inserts, the inserts having a recess on one face adapted to hold and enclose a lunette eye and hold the lunette eye of the trailer firmly within the housing. A retention pin extends through the apertures in the housing the lunette eye of the trailer and the apertures in the rectangular inserts to hold the adapter and parts together. For attachment to a towing truck or other vehicle.

1 Claim, 1 Drawing Sheet

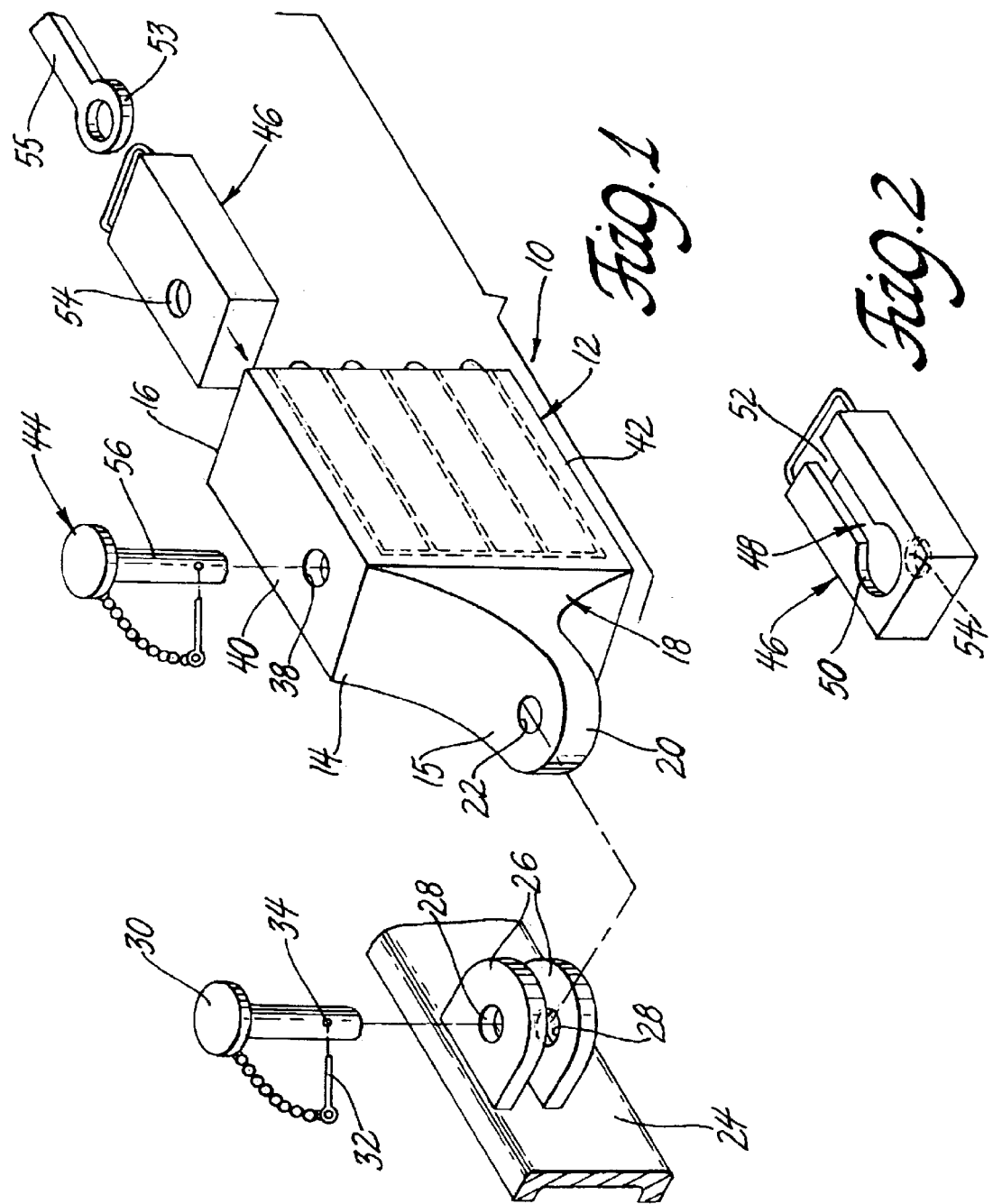

US 6,769,710 B1

LUNETTE HITCH APPARATUS

GOVERNMENT INTEREST

The invention described here may be made, used and licensed by and for governmental purposes without paying me any royalty.

BACKGROUND OF THE INVENTION

In one aspect this invention relates to vehicular trailer hitches. More particularly, this invention relates to vehicular trailer hitches of the lunette type frequently used on trailers for construction equipment and other heavy-duty trailers.

Trailers for construction equipment and other heavy-duty trailers often use a lunette eye trailer tongue construction. The lunette type tongue includes a rigid, durable, hitch ring or eye in the shape of a torus, which can be placed over or secured to a vertical post or pin on the vehicle. While the lunette eye allows a certain amount of vertical movement of the trailer tongue along the vertical post, the primary movement is horizontal in nature. Lunette eye trailers are particularly advantageous for construction equipment and other heavy-duty off-road type usage. A lunette hitch obviates the need for sockets and other closed hitching structures that are subject to corrosion, dirt collection and rapid deterioration when exposed to weather and other severe operating conditions. Of course, military type vehicles are classic examples of vehicles subjected to severe usage.

In addition to harsher than normal operating conditions, military equipment has a very long life cycle. Thus, it is necessary for older equipment to be mated with newer vehicles or trailers which were not designed to operate as a unit. Since all the parts of one system are designed to operate together but may have different operating parameters, there are times when a required vehicle is not available to mate with a particular trailer configuration. This creates problems and the trailer cannot be used.

In addition to age and design parameters, military trailers run the gamut from small ½ ton light-duty trailers up to substantial high tonnage trailers designed to haul large quantities of heavy cargo and ammunition.

It would be desirable to have a vehicle hitch adapter which can be used with the lunette eye of the trailer tongue and allow the trailer be functionally attached to a wide variety of powered equipment in the military fleet having a lunette type mounting. Such an adapter should be simple in construction, easy-to-use and allow the trailer tongue to be attached to a variety of vehicles where the hitch height varies over a distance of several inches.

SUMMARY OF THE INVENTION

The vehicular trailer hitch adapter of the present invention solves the problems of mismatched equipment. The adapter can be used with a trailer or other towed device which has a lunette eye mounted on the end of a towing tongue. The lunette eyes are generally toroidal in nature and firmly attached to the end of the towing tongue. However, the lunette structure can also be formed as a rounded end on the towing tongue with an aperture formed near the terminus of the tongue, the tongue generally formed with flat parallel faces. The lunette structure is used to attach the trailer to a truck or other prime mover having a complimentary mounting such as a pintle, or boss and pin structure adapted to receive and hold the lunette eye.

The adapter of this invention has a housing with a lunette eye structure that extends from one end. The lunette structure is adapted to mate with a corresponding structure on the vehicle that is to tow the desired piece of equipment. The housing has apertures formed in its upper and lower faces to allow insertion of a retention pin.

A plurality of rectangular inserts nest within the housing. Each insert has a recess formed on one face, the recess adapted to hold and enclose the lunette eye of the tongue attached to the towed device. The recess is sized to hold the lunette and at least a portion of the tongue near the eye to retain the lunette eye of the trailer firmly within the housing. Each insert has an aperture formed in the recess, the apertures in the inserts aligning coaxially with the lunette eye when the lunette is in the recess and also aligning with the apertures in the upper and lower faces of the housing. Thus when the inserts, and lunette are all located within the housing, the retention pin's elongated cylindrical body can be inserted into and extend through all the apertures to bind the unit together.

BRIEF DESCRIPTION OF THE DRAWINGS

In the accompanying drawing:

FIG. 1 is a perspective view of one embodiment of this invention; and

FIG. 2 is a perspective view of an insert of FIG. 1

DETAILED DESCRIPTION

Referring to the accompanying drawing wherein like numerals refer to like parts, an adapter of this invention, designated generally 10, has a housing 12 formed as a rectangular housing with a closed end 14 and an open end 16. The closed end 14 has a lunette eye structure 18 extending perpendicularly outward from the closed end. This particular lunette structure 18 is formed from a shaped boss 15 extending from the closed face 14, the boss having a semicircular rounded end 20 and a hitch aperture 22 formed near the end of the lunette 18. The lunette structure 18 will be juxtaposed a bumper 24 attached to a vehicle, not shown. In the attachment structure shown in the drawing, the bumper 24 has two semicircular bosses 26 attached to the bumper in a spaced relationship so the lunette structure 18 can be inserted between the bosses. Each boss 26 has an aperture 28 the apertures being coaxially aligned. Once the lunette 18 is positioned between bosses 28, a pin 30 is inserted through the apertures 28 in the bosses and aperture 22 in the lunette 18 to hold the lunette in position. A keeper pin 32 can be provided and is inserted into an aperture 34 in pin 30 to hold pin 30 in position during towing. Although shown as two parallel bosses 26, the towing structure attached to the bumper 24 can also be of an upright pintle structure common in the art provided the pintle structure will provide acceptable towing characteristics for the device being transported. When the structure shown is used, the space between the bosses 26 will determine the amount of vertical movement of the lunette 18 allowed when the hitch is engaged. The movement allowed will frequently be determined by the expected operating conditions and it may be desirable in some instances to provide a fairly rigid towing attachment with minimal vertical play while in other instances it may be desirable to allow the vehicle to disengage to prevent rollover of the vehicle if the towed device begins to roll.

The housing 12 has an aperture 38 formed in both the upper and lower faces 40, 42 respectively of the housing to allow insertion of a retention pin 44. The retention pin 44 will serve to hold all the pieces of the adapter 10 when inserted as described hereinafter.

The adapter 10 has a plurality of rectangular inserts 46 that are nested within the housing 12. Each of the inserts 46 has a shaped recess 48 formed on one face the recess shown being a keyway recess with a circular portion 50 being formed within the insert. The circular portion 50 communicates with one end of the insert 46 by means of a channel 52. The recess 48 is adapted to hold and enclose a toroidal lunette eye 53 which is attached to a tongue 55 extending from the device to be towed, not shown. The keyhole design would be appropriate for the lunette eye configuration shown, however other configurations may be present in fielded vehicles. Thus, it is contemplated that the inserts 48 could be formed with different recess configurations so as to allow different trailers and wagons to be attached to the adapter 10. A particular adapter 10 could have as many different insert recess configurations as there are adapters in the housing. The recess 48 will be sized so as to hold at least a portion of the tongue 55 attached to the towed device to help consolidate the adapter as a firm extension of the tongue. Each insert has an aperture 54 formed in the recess 48 the aperture 54 being coaxially aligned with the lunette eye 53 when the lunette is in the recess. When the inserts 46, and lunette eye 53 are located within the housing, the retention pin 44 will have its elongated cylindrical body 56 extending through the apertures 38 in the housing the lunette eye of the trailer and the apertures 54 formed in the rectangular inserts 46 to bind the unit together. As shown the retention pin 44 has a small hole placed near the end that can receive a keeper pin or cotter type pin to hold retention pin 44 during travel.

As shown, the inserts 46 have the shaped recess 50 formed on one face. Thus the trailer tongue 55 height can be adjusted by approximately one-half the insert thickness by virtue of whether the insert is placed above or below the lunette eye 53. With the four inserts configuration shown this gives 8 different height adjustments in one compact unit creating a wide variety of adjustments and up to 4 different shaped recess configurations.

Various alterations and modifications will become apparent to those skilled in the art without departing from the scope and spirit of this invention and it is understood this invention is limited only by the following claims.

What is claimed is:

1. A vehicular trailer hitch apparatus for a trailer having a lunette eye mounted on a trailer tongue for attachment to a vehicle having a complementary mounting for receiving the lunette eye, comprising a housing having the lunette eye extending from one end thereof, and apertures formed in upper and lower faces of the housing, a plurality of rectangular inserts nested within the housing, each insert having a recess on one face, the recess holding and enclosing the lunette eye, and at least a portion of the tongue, the insert including an aperture, the aperture being coaxially aligned with the lunette eye, a retention pin extending through the apertures in the housing, the lunette eye, and the apertures in the inserts, and, the pin having a head on one end, and an aperture on an opposite end, the aperture accommodating a retention clip to maintain the retention pin in position.

* * * * *